United States Patent [19]

Stacey

[11] Patent Number: 4,924,338

[45] Date of Patent: May 8, 1990

[54] PROLONG VCR TAPE CASSETTE

[76] Inventor: Tyrone B. Stacey, 122-34 Nellis St., Springfield Gardens, N.Y. 11431

[21] Appl. No.: 278,766

[22] Filed: Dec. 2, 1988

[51] Int. Cl.$^5$ .......................................... G11B 23/087
[52] U.S. Cl. ................................................ 360/132
[58] Field of Search ...................... 360/132; 242/199

[56] References Cited

U.S. PATENT DOCUMENTS 3,974,975  8/1976  Holmes ................................. 360/132
4,016,602  4/1977  Giolitti et al. ....................... 360/132
4,074,876  2/1978  Gourley ............................... 360/132

Primary Examiner—Robert S. Tupper
Attorney, Agent, or Firm—Richard L. Miller

[57] ABSTRACT

A VCR cassette having a pair of hubs, one containing a pivotal member to which one end of a tape magnetized on both surfaces is fixed. A first reel is mounted on the one hub and a take-up reel is mounted on the other hub. Mechanism is provided between the two reels for rotating the tape whereby video data can be recorded and played back on either surfaces of the tape.

8 Claims, 2 Drawing Sheets

PROLONG VCR TAPE CASSETTE

BACKGROUND OF THE INVENTION

1. Field of the Invention

This invention relates generally to an improved cassette for recording and reproducing pictorial information on both sides of a Video Cassette Recorder tape.

2. Description of Prior Disclosures

The prior art, as exemplified by U.S. Pat. No. 4,074,876 of Gourley; U.S. Pat. No. 4,000,519 of Turk and U.S. Pat. No. 3,974,975 of Holmes are generally illustrative of the pertinent art but the aforementioned patents are not applicable to the present invention. While the prior art expedients are generally acceptable for their intended purposes only, they have not proven entirely satisfactory in that they are either complex and expensive to manufacture, or bulky and inconvenient to use. As a result of these shortcomings of the prior art, as typified by the above, there has developed a substantial need for improvement in this field.

SUMMARY OF THE INVENTION

This invention resides in a generally rectangular cassette housing made of conventional material which accommodates a video recording tape of the type which accepts and contains video data on both sides thereof. This tape is of conventional construction such as that now typically used on existing video cassettes, except that magnetic material is coated on both sides of the tape, in a manner similar to the technology applied to two-sided computer diskettes. The tape travels from one reel to another in the cassette in a manner similar to conventional existing cassettes. However there is an actuating mechanism mounted in the cassette through which the tape passes for turning over the tape from a first sided A to a second side B when required or desired.

A primary object of the present invention is to provide a video cassette tape having front and back recording surfaces that will overcome the shortcomings of the prior art devices.

Another object is to provide an improved video cassette which records and plays both sides to increase useful time thereof.

An additional object is to provide a simplified mechanism for turning over a tape so as to use both sides thereof.

A further object is to provide a mechanism in a cassette container for straightening out a tape therein which may have curled.

A still further object of this invention is to provide a dual sided video tape cassette that is simple and easy to use.

A yet further object is to provide a dual sided video tape cassette that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
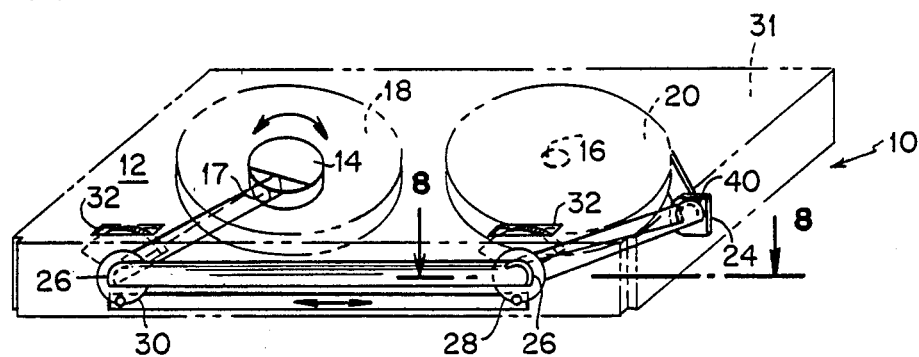
FIG. 1 is a diagrammatic perspective view of the cassette of this invention shown partly in cross-section.

With reference to the drawing, there is shown and illustrated a video cassette constructed in accordance with the principles of the invention and designated by reference character 10, which comprises several interrelated major components; namely a housing or cartridge 12, inside of which are mounted a pair of hubs 14 and 16, which rotatively support spools 18 and 20. The latter being the take-up reel for a magnetic tape 22 which is adapted to be wound on the reels. Spool 18 has a circular opening 17 in its hub 14.

Figure 2:
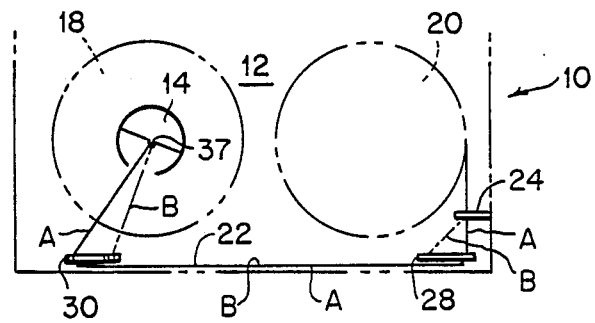
FIG. 2 is a top plan diagrammatic view illustrating how the tape can be switched between side A and side B thereof.
Figure 3:
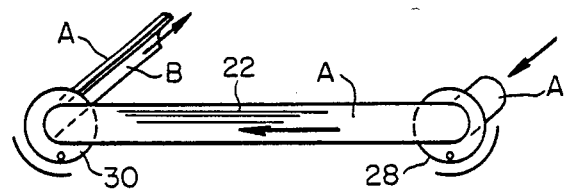
FIG. 3 is a diagrammatic perspective view showing the tape winding with side A facing the outer adjacent edge of the cartridge.
Figure 4:
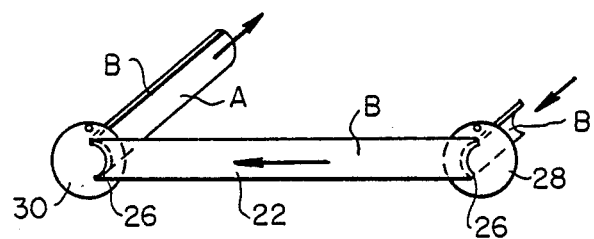
FIG. 4 is a diagrammatic perspective view showing the tape winding with side B facing the outer adjacent edge of the cartridge.

As shown in FIGS. 1 and 2, a portion of the tape which is not wound up on the reels passes through U-slot 40 in guide 24, then through semi-circular or U-slots 26 in thumb wheels 28 and 30. These thumb wheels are rotatively mounted and project partly through the top 31 of housing 12 through openings 32 therein. Wheels 28 and 30 are knurled to facilitate rotating with fingers.

Rotation of each thumb wheel causes the tape to twist exactly 180° so that by fully turning both wheels the tape is fully revealed (as best seen in FIGS. 3 through 6). As a result, the opposite surfaces A or B of the tape will be exposed to the magnetic mechanism device of the video cassette instrument such as the recording and playing mechanisms thereof. Such mechanisms (not shown) can consist of a conventional magnetic pick-up or like device for generating a signal corresponding to the intelligence recorded or to be recorded on the magnetic tape. When the cassette is inserted in a VCR, its magnetic mechanism will engage the recording surface of the tape through windows beneath the cartridge (not shown) on the opposite sides of the cassette.

The tape 22 has a coating of a suitable recording medium on both its surfaces (A and B) and the tape material serves as a magnetic shield there between to prevent interference between the two surfaces. This is generally accomplished by controlling the depth of the recording data so as to not penetrate through the tape material from the magnetic surface on a first side A to the second side B.

The thickness of the medium on the tape should be such that use of one side of the tape will not interfere with the usefulness of the other side.

Figure 5:
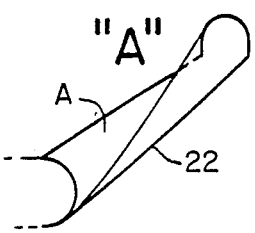
FIGS. 5 and 6 are diagrammatic perspective views illustrating how the tape is twisted so as to be played on either side.
Figure 6:
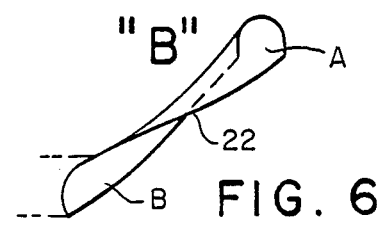
Figure 7:
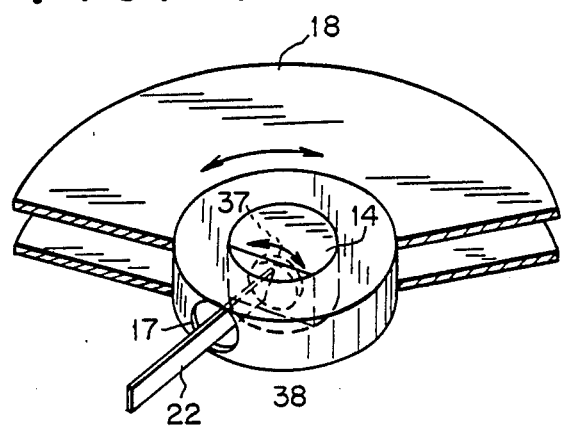
FIG. 7 is a fragmentary perspective view of the hub portion of the take-up tape reel.

As detailed in FIGS. 2 and 7, the hub 14 of spool 18 is cut out with a circular opening 17 for allowing passage of first end of tape 22 for securing same to a slot 37 in the hub's inner pivot 38 (best seen in FIG. 7), which can rotate through 180°. This first end can be doubled over and friction fitted in slot 37 (best seen in FIGS. 1,2 and 7) as tape 22 is pulled out of take-up spool 20, it will pass through the U-shaped slot 40 (best seen in FIG. 1) of guide 24 and hence through semi-circular slot 26 of wheel 28. This will give the tape a half-twist as shown in FIG. 5 and 6. Rotating wheel 30 will make it twist by another half twist with the result shown in FIG. 4 where tape surface A, which was on the outside, is now on the inside; and tape surface B which had been inside is now on the outside relative to the sides of the housing.

Figure 8:
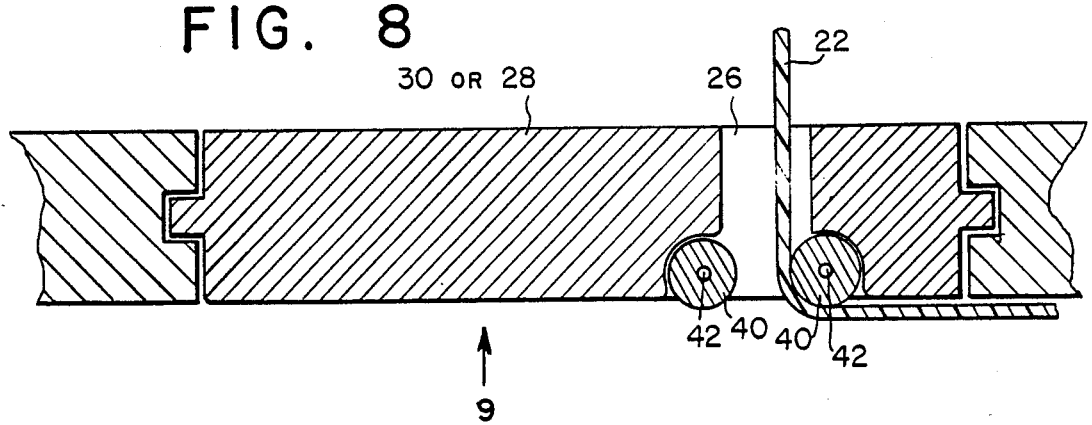
FIG. 8 is a cross sectional view of a thumb wheel taken on line 8—8 of FIG. 1 of part of the tape flip-over mechanism.
Figure 9:
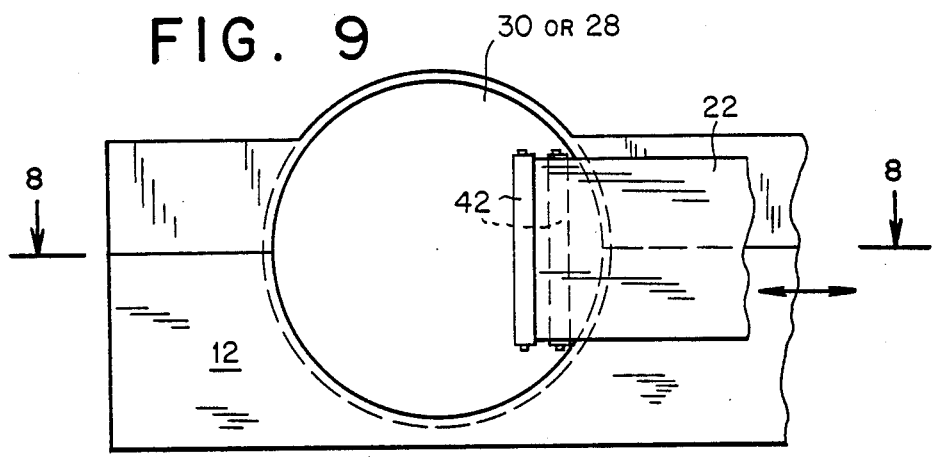
FIG. 9 is a greatly enlarged view taken along arrow 9 of FIG. 8 to show another view of the thumb wheel.

Naturally, the twist mechanism of the invention will work only when spool or reel 18 is empty, for otherwise the wound coils of the tape would prevent turning the end thereof. To prevent damage to tape 22 as it passes through wheels 28 and 30, an alternate embodiment of the wheels 28 and 30 are illustrated with rollers 40 which are rotatively journalled in the side of slot 26 on shafts 42 as shown in FIGS. 8 and 9.

It will be realized that by turning wheel 28 to the right and wheel 30 to the left, the tape 22 will be locked into position.

In use position, the cassette of the invention is inserted in the VCR and operated until spool 18 is empty. Then wheels 28 and 30 are activated as above described to reverse the tape so that additional play time is accessible. Because both surfaces of the tape can be used, the capacity of the instant cassette can be substantially doubled without increasing its size. The dimensions of this cassette can be identical to those of conventional cassettes. Preferably, the spools, the wheels and the guide will be arranged in co-planar relationship, as shown in FIG. 1.

The operation and use of the invention herein above described will be evident to those skilled ;in the art to which it relates from a consideration of the foregoing.

It will thus be seen that there is provided a device in which the several objects of this invention are achieved, and which is well adapted to meet the conditions of practical use.

It is thought that persons skilled in the art to which this invention relates will be able to obtain a clear understanding of the invention after considering the foregoing description in connection with the accompanying drawing. Therefore, a more lengthy explanation is unnecessary.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A cassette for a video cassette recorder which comprises:
   (a) a housing for storing and transporting a magnetic tape;
   (b) a first hub rotatively mounted in said housing, said hub having an inlet with a slot contained within a pivot rotatable within said hub;
   (c) a first reel supported on said hub;
   (d) a second hub rotatively mounted in said housing;
   (e) a take-up reel on said second hub;
   (f) a magnetic tape having front and back recording surfaces and including an end portion fixed in said slot and a twisted portion;
   (g) a guide having a semi-circular slit through which said twisted portion passes;
   (h) a first actuating means receiving said twisted portion as it issues from said semi-circular slit for imparting a half twist to said magnetic tape in a first rotational direction; and
   (i) a second actuating means receiving said twisted tape for completing the twisting thereof by rotating said twisted tape against said pivot, said actuating means projecting partly out of said housing for actuation of same.

2. A cassette for a video cassette recorder as recited in claim 1, wherein means for easing the movement of said magnetic tape is provided in at least one of said actuating means.

3. A cassette for a video cassette recorder as recited in claim 2, wherein said actuating means consist of thumb wheels and said means for easing the movement of said magnetic tape is rollers journalled in said thumb wheels, said thumb wheels projecting partially from said cassette housing.

4. A cassette for a video cassette recorder as recited in claim 3, wherein said hubs, said reels and said guide are arranged in generally co-planar relationship.

5. The cassette of claim 4, wherein said housing includes a top, said top having openings for said actuating means.

6. A cassette for a video cassette recorder as recited in claim 1, wherein said actuating means consist of thumb wheels having semicircular tape receiving slots, said thumb wheels projecting partially from said cassette housing.

7. A cassette for a video cassette recorder as recited in claim 6, wherein said hubs, said reels and said guide are arranged in generally co-planar relationship.

8. The cassette of claim 7, wherein said housing includes a top, said top having openings for said actuating means.

* * * * *